3,196,140
THREE-COMPONENT CATALYST FOR OLEFIN POLYMERIZATION CONTAINING ALKALI METAL-ALUMINUM TETRAALKYL TRANSITION METAL HALIDE AND A STIBINE OR ARSINE
Harry W. Coover, Jr., Kingsport, Tenn., and Newton H. Shearer, Jr., Zurich, Switzerland, assignors to Eastman Kodak Company, Rochester, N.Y., a corporation of New Jersey
The portion of the term of the patent subsequent to Jan. 8, 1980, has been disclaimed and dedicated to the Public
No Drawing. Filed May 31, 1962, Ser. No. 198,718
12 Claims. (Cl. 260—93.7)

This invention relates to a new and improved polymerization process and is particularly concerned with the use of a novel catalyst combination for preparing high molecular weight solid polyolefins, such as polypropylene, of high density and crystallinity. In a particular aspect, the invention is concerned with the preparation of polypropylene and higher polyolefins using a particular catalyst combination which has unexpected catalytic activity and which gives products characterized by unusually high crystallinity, softening point, thermal stability, stiffness and being substantially free of non-crystalline polymers.

This application is a continuation-in-part of our copending application Serial No. 724,908, filed March 31, 1958, and now abandoned.

Polyethylene has heretofore been prepared by high pressure processes to give relatively flexible polymers having a rather high degree of chain branching and a density considerably lower than the theoretical density. Thus, pressures of the order of 500 atmospheres or more and usually of the order of 1000 to 1500 atmospheres are commonly employed. It has been found that more dense polyethylenes can be produced by certain catalyst combinations to give polymers which have very little chain branching and a high degree of crystallinity. The exact reason why certain catalyst combinations give these highly dense and highly crystalline polymers is not readily understood. Furthermore, the activity of the catalysts ordinarily depends upon certain specific catalyst combinations, and the results are ordinarily highly unpredictable, since relatively minor changes in the catalyst combination often lead to liquid polymers rather than the desired solid polymers.

Alkali metal-aluminum tetraalkyls have been suggested for use in conjunction with inorganic halides to produce high molecular weight polyethylene. Thus, it has been suggested that such tetraalkyls can be used with transition metal halides in the low pressure polymerization of ethylene. When these catalysts are employed to polymerize propylene and higher α-monoolefins, the resulting polymeric product contains large amounts of oils, greases and rubbery polymers instead of the desired high molecular weight, crystalline product. Obviously, such results are unsatisfactory when a crystalline polymer is the desired product, and it is one of the purposes of this invention to overcome the undesirable results obtained when prior art catalysts are used.

This invention is concerned with and has for an object the provision of improved processes whereby α-monoolefins and particularly propylene and higher α-olefins can be readily polymerized by catalytic means to give high molecular weight, highly crystalline polymers. A particular object of the invention is to provide a catalyst combination which has unexpected catalytic activity for the polymerization of α-monoolefins to form crystalline high density polymers. Other objects will be apparent from the description and claims which follow.

These and other objects are attained by means of the process embodying the present invention wherein α-monoolefins, either singly or in admixture, are readily polymerized to high molecular weight solid crystalline polymers by effecting the polymerization in the presence of a catalytic mixture containing an alkali metal-aluminum tetraalkyl, wherein each of the alkyl radicals contains from 1 to 12, preferably 1 to 4, carbon atoms, a halide of a transition metal selected from the group consisting of titanium, vanadium, zirconium, chromium, and molybdenum, the halogen atoms being selected from the group consisting of chlorine, bromine and iodine and a Group VA compound having the formula $R_3Z$ wherein Z is selected from the group consisting of arsenic and antimony and each R is selected from the group consisting of hydrogen, and hydrocarbon radicals containing 1 to 12 carbon atoms and selected from the group consisting of alkyl, aryl and aralkyl. Among these hydrocarbon radicals are methyl, ethyl, propyl, butyl, octyl, dodecyl, phenyl, phenylethyl and naphthyl. In the Group VA compound the three radicals represented by R can be the same or different. The catalytic activity of this mixture was wholly unexpected, particularly since the mixture, in the absence of the third component, produces large amounts of oils and rubbers when propylene and higher α-monoolefins are polymerized, and the third component is not a known polymerization catalyst. The inventive process is carried out in liquid phase in an inert organic liquid and preferably an inert liquid hydrocarbon vehicle, but the process can be carried out in the absence of a diluent. The process proceeds with excellent results over a temperature range of from 0° C. to 250° C. although it is preferred to operate within the range of from about 50° C. to about 150° C. Likewise, the reaction pressures may be varied widely from about atmospheric pressure to very high pressures of the order of 20,000 p.s.i. or higher. A particular advantage of the invention is that pressures of the order of 30 to 1000 p.s.i. give excellent results, and it is not necessary to employ the extremely high pressures which were necessary heretofore. The liquid vehicle employed is desirably one which serves as an inert liquid reaction medium.

The invention is of particular importance in the preparation of highly crystalline polypropylene, the polybutenes and polystyrene although it can be used for polymerizing mixtures of ethylene and propylene as well as other α-monoolefins containing up to 10 carbon atoms. The polypropylene produced in accordance with this invention is a highly crystalline polymer that can be used in molding operations to form products of excellent clarity. The high molecular weight, high density polymers of this invention are insoluble in solvents at ordinary temperatures but are partially soluble in such solvents as xylene, toluene or tetralin at elevated temperatures. These solubility characteristics make it possible to carry out the polymerization process under conditions wherein the polymer formed is soluble in the reaction medium during the polymerization and can be precipitated therefrom by lowering the temperature of the resulting mixture.

The novel catalysts described above are particularly useful for polymerizing propylene to form a crystalline, high density polymer. The polypropylene produced has a softening point above 155° C. and a density of 0.91 and higher. Usually the density of the polypropylene is of the order of 0.91 to 0.92.

The polypropylene, polystyrene, polybutenes and other polyolefins prepared in accordance with the invention can be molded or extruded and can be used to form plates, sheets, films, or a variety of molded objects which exhibit a higher degree of stiffness than do the corresponding high pressure polyolefins. The products can be extruded in the form of pipe or tubing of excellent rigidity and can be injection molded into a great variety of articles. The polymers can also be cold drawn into ribbons, bands, fibers or filaments of high elasticity and rigidity. Fibers of high strength can be spun from the molten polyolefins obtained according to this process.

The improved results obtained in accordance with the invention depend upon the particular combination of catalyst materials defined herein. Thus, one of the components of the catalyst is an alkali metal-aluminum tetraalkyl, the alkali metal being selected from the group consisting of sodium, potassium and lithium and each of the alkyl radicals containing from 1 to 12 carbon atoms, specifically, the alkyl radicals can be methyl, ethyl, propyl, butyl, pentyl, octyl, dodecyl, and the like. Another component of the catalyst composition is a halide of a transition metal selected from the group consisting of titanium, vanadium, zirconium, chromium and molybdenum, the halogen atoms being selected from the group consisting of chlorine, bromine and iodine. The transition metal can be at its maximum valency or at a reduced valency. Thus, titanium tetrachloride as well as titanium trichloride and titanium dichloride can be used in the catalyst composition. The third component of the catalyst composition is a compound of a Group VA element having the structural formula $R_3Z$ wherein Z is a Group VA element selected from the group consisting of arsenic and antimony. Each R is a radical selected from the group consisting of hydrogen and hydrocarbon radicals containing 1 to 12 carbon atoms and selected from the group consisting of alkyl, aryl and aralkyl. In this third component the R radicals can be the same but in some instances it is desired to employ different radicals within the definition set forth above.

Among the catalyst systems that can be used in the practice of our invention are:

(a) Sodium aluminum tetrabutyl, titanium tetrachloride and triethyl arsine,
(b) Potassium aluminum tetraoctyl, vanadium tribromide and tripropyl stibine,
(c) Lithium aluminum tetradodecyl, zirconium tetraiodide and tributyl arsine,
(d) Sodium aluminum tetramethyl, chromium trichloride and trihexyl stibine,
(e) Potassium aluminum tetraethyl, molybdenum tetraiodide and triphenyl arsine,
(f) Lithium aluminum tetrapropyl, titanium trichloride and triphenyl stibine,
(g) Sodium aluminum tetrabutyl, titanium trichloride and trinaphthyl arsine,
(h) Potassium aluminum tetrapentyl, vanadium trichloride and trinaphthyl stibine,
(i) Lithium aluminum tetrahexyl, zirconium tetrachloride and tri(phenylethyl)arsine,
(j) Sodium aluminum tetraoctyl, titanium trichloride and tri(phenylethyl)stibine,
(k) Potassium aluminum tetraethyl, titanium trichloride and arsine, and
(l) Lithium aluminum tetraethyl, titanium trichloride and stibine.

The limiting factor in the temperature of the process appears to be the decomposition temperature of the catalyst. Ordinarily, temperatures from 50° C. to 150° C. are employed, although temperatures as low as 0° C. or as high as 250° C. can be employed, if desired. Usually, it is not desirable or economical to effect the polymerization at temperatures below 0° C., and the process can be readily controlled at room temperature or higher which is an advantage from the standpoint of commercial processing. The pressure employed is usually only sufficient to maintain the reaction mixture in liquid form during the polymerization, although higher pressures can be used if desired. The process is ordinarily achieved by pressuring the system with the monomer whereby additional monomer dissolves in the reaction vehicle as the polymerization progresses.

The polymerization embodying the invention can be carried out batchwise or in a continuous flowing stream process. The continuous processes are preferred for economic reasons, and particularly good results are obtained using continuous processes wherein a polymerization mixture of constant composition is continuously and progressively introduced into the polymerization zone and the mixture resulting from the polymerization is continuously and progressively withdrawn from the polymerization zone at an equivalent rate, whereby the relative concentration of the various components in the polymerization zone remains substantially unchanged during the process. This results in formation of polymers of extremely uniform molecular weight distribution over a relatively narrow range. Such uniform polymers possess distinct advantages since they do not contain any substantial amount of the low molecular weight or high molecular weight formations which are ordinarily found in polymers prepared by batch reactions.

In the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 30 to 1000 p.s.i. obtained by pressuring the system with the monomer being polymerized. The amount of vehicle employed can be varied over rather wide limits with relation to the monomer and catalyst mixture. Best results are obtained using a concentration of catalyst of from about 0.1% to about 2% by weight based on the weight of the vehicle. The concentration of the monomer in the vehicle will vary rather widely depending upon the reaction conditions and will usually range from about 2 to 50% by weight. For a solution type of process it is preferred to use a concentration from about 2 to about 10% by weight based on the weight of the vehicle, and for a slurry type of process higher concentrations, for example, up to 40% and higher are preferred. Higher concentrations of monomer ordinarily increase the rate of polymerization, but concentrations above 5 to 10% by weight in a solution are ordinarily less desirable because the polymer dissolved in the reaction medium results in a very viscous solution.

The molar ratio of tetraalkyl to transition metal halide can be varied within the range of from 1:0.5 to 1:2, and the molar ratio of transition metal halide to third component can be within the range of 1:1 to 1:0.1. It will be understood that higher and lower molar ratios are within the scope of this invention. The polymerization time can be varied as desired and will usually be of the order of from 30 minutes to several hours in batch processes. Contact times of from 1 to 4 hours are commonly employed in autoclave type reactions. When a continuous process is employed, the contact time in the polymerization zone can also be regulated as desired, and in some cases it is not necessary to employ reaction or contact times much beyond one-half to one hour since a cyclic system can be employed by precipitation of the polymer and return of the vehicle and unused catalyst to the charging zone wherein the catalyst can be replenished and additional monomer introduced.

The organic vehicle employed can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene, or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono and dialkyl naphthalenes, n-octane, isooctane, methyl cyclohexane, tetralin, decalin, and any of the other well known inert liquid hydrocarbons.

The polymerization ordinarily is accomplished by merely admixing the components of the polymerization mixture, and no additional heat is necessary unless it is desired to effect the polymerization at an elevated temperature in order to effect the polymerization at an elevated temperature in order to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

The diluents employed in practicing this invention can be advantageously purified prior to use in the polymerization reaction by contacting the diluent, for example, in a distillation procedure or otherwise, with the polymerization catalyst to remove undesirable race impurities. Also, prior to such purification of the diluent the catalyst can be contacted advantageously with a polymerizable $\alpha$-monoolefin Thus, by means of this invention polyolefins are readily produced using a catalyst combination which, based on the knowledge of the art, would not be expected to produce the results obtained. The polymers thus obtained can be extruded, mechanically milled, cast or molded as desired. The polymers can be used as blending agents with the relatively more flexible high pressure polyethylenes to give any desired combination of properties The polymers can also be blended with antioxidants, stabilizers, plasticizers, fillers, pigments, and the like, or mixed with other polymeric materials, waxes and the like. In general, aside from the relatively higher values for such properties as softening point, density, stiffness and the like, the polymers embodying this invention can be treated in similar manner to those obtained by other processes.

From the detailed disclosure of this invention it is quite apparent that in this polymerization procedure a novel catalyst, not suggested in prior art polymerization procedures, is employed. As a result of the use of this novel catalyst it is possible to produce polymeric hydrocarbons, particularly polypropylene, having properties not heretofore obtainable. For example, polypropylene prepared in the presence of catalyst combinations within the scope of this invention is substantially free of rubbery and oily polymers and thus it is not necessary to subject such propylene of this invention to extraction procedures in order to obtain a commercial product. Also, polypropylene produced in accordance with this invention possesses unexpectedly high crystallinity, an unusually high softening point and outstanding thermal stability. Such polypropylene also has a very high stiffness as a result of the unexpectedly high crystallinity. The properties imparted to polypropylene prepared in accordance with this invention thus characterize and distinguish this polypropylene from polymers prepared by prior art polymerization procedures.

The novel catalysts defined above can be used to produce high molecular weight crystalline polymeric hydrocarbons. The molecular weight of the polymers can be varied over a wide range by introducing hydrogen to the polymerization reaction. Such hydrogen can be introduced separately or in admixture with the olefin monomer. The polymers produced in accordance with this invention can be separated from polymerization catalyst by suitable extraction procedures, for example, by washing with water or lower aliphatic alcohols such as methanol.

The catalyst compositions have been described above as being effective primarily for the polymerization of $\alpha$-monoolefins. These catalyst compositions can, however, be used for polymerizing other $\alpha$-olefins, and it is not necessary to limit the process of the invention to monoolefins. Other $\alpha$-olefins that can be used are butadiene, isoprene, 1,3-pentadiene and the like.

The importance of the various components of this reaction mixture is evident from the fact that in polymerizing propylene a mixture of one of the tetraalkyls and transition metal halide produces large amounts of low molecular weight rubbery polymer. However, when the third component within the scope of this invention is added to the mixture the resulting catalyst composition is highly effective for polymerizing propylene to form a highly crystalline high density polymer.

The following examples are illustrative of this invention.

*Example 1*

This example illustrates the relatively large quantity of rubbery polymer obtained with a catalyst composed of an alkali metal-aluminum tetraalkyl and a transition metal halide. In a nitrogen-filled dry box a 1-g. catalyst charge comprising equimolar quantities of sodium aluminum tetraethyl and titanium tetrachloride was added to a 500 ml. pressure bottle along with 100 ml. of dry heptane. The pressure bottle was then capped, removed from the dry box, and attached to a propylene source provided by means of a converted Parr hydrogenation apparatus. The mixture was agitated, heated to 55° C. and maintained under 30 p.s.i. propylene pressure for six hours. At the end of this period the resulting polymer was washed several times with dry methyl alcohol and then with water. The weight of the polypropylene was 18.0 g., having a density of 0.899 and an inherent viscosity of 2.11. After extraction of the rubbery polypropylene by the use of dibutyl ether at 70° C., residual highly crystalline polypropylene weighed 7.9 g., had a density of 0.915, and an inherent viscosity at 145° C. in tetralin of 2.24. When $TiCl_3$ replaced $TiCl_4$ under the above conditions, a slight increase in crystallinity of the product was noted. The 16.3 g. of polypropylene had a density of 0.906 and an inherent viscosity of 2.66. After extraction with dibutyl ether, the residual highly crystalline polypropylene weighed 9.8 g. and had a 0.917 density and an inherent viscosity of 2.87.

*Example 2*

The procedure of Example 1 was used, but the catalyst was comprised of 0.62 g. sodium aluminum tetraethyl, 0.66 g. triphenyl stibine, and 0.72 g. titanium tetrachloride. The weight of polymer obtained in six hours at 55° C. and 30 p.s.i. propylene was 23.2 g. The density of this product was 0.908. Extraction with dibutyl ether left a residue of 17.6 g. which had a density of 0.917.

When $TiCl_3$ was substituted for $TiCl_4$ a yield of 21.5 g. was obtained. Only 3% of this product was extractable in dibutyl ether.

*Example 3*

The procedure of Example 2 was followed, but $VCl_3$ was used instead of $TiCl_4$. A yield of 24.7 g. was obtained. The portion of this product soluble in dibutyl ether was 6% of the total. The inherent viscosity was 2.7.

*Example 4*

The procedure of Example 2 was followed, except that litium aluminum tetrahexyl was substituted, on a molar basis, for the sodium aluminum tetraethyl. A yield of 28.3 g. was obtained with $TiCl_4$ with an ether-soluble content of 5%. When TiCl₃ was used, the yield was 26.7 g. with an ether-soluble content of 2%.

*Example 5*

The procedure of Example 2 was followed, but triphenyl arsine was substituted for the stibine, and CiCl₃ was used instead of TiCl₃. The yield was 15 g. of polypropylene containing 1.5% ether-extractable material.

*Example 6*

The procedure of Example 2 was followed, except that potassium aluminum tetrabutyl was used instead of the sodium aluminum tetraethyl and CrO₂Cl₂ was used instead of TiCl₄. A yield of 17.6 g. of polypropylene was obtained. This product contained 4% ether-extractable material. Similar results were obtained when the monomer, in liquid form, was 4-methyl-1-pentene.

*Example 7*

A catalyst comprising a mixture of 0.62 g. NaAlEt₄, 0.33 g. As (C₆H₁₃)₃, and 1.2 g. TiCl₃ was placed in a dry, clean, stainless steel autoclave which had a capacity of 310 ml. and which was filled with dry nitrogen. The autoclave was sealed, and purged with dry propylene. Two hundred milliliters of dry liquid propylene was forced into the autoclave from a blowcase. The mixture was heated to 85° C. with rocking. At the end of four hours the autoclave was cooled and opened. The contents were washed with methanol. A yield of 82 g. of ploypropylene was otbained. This product contained 3% of material soluble in dibutyl ether. Similar results were obtained when an equivalent quantity of tribenzyl stibine was used instead of the trihexyl arsine.

We claim:

1. In the polymerization of α-olefinic hydrocarbon material to form solid crystalline polymer, the improvement which comprises catalyzing the polymerization with a catalytic mixture containing an alkali metal-aluminum tetraalkyl, the alkyl radicals containing from 1 to 12 carbon atoms, a halide of a metal selected from the group consisting of titanium, vanadium, zirconium, chromium and molybdenum, the halogen being selected from the group consisting of chlorine, bromine and iodine, and a compound of a Group VA element having the formula R₃Z wherein Z is a Group VA element selected from the group consisting of arsenic and antimony and each R is a radical selected from the group consisting of hydrogen and hydrocarbon radicals containing 1 to 12 carbon atoms and selected from the group consisting of alkyl, aryl and aralkyl.

2. In the polymerization of propylene to form solid crystalline polymer, the improvement which comprises effecting the polymerization in liquid dispersion in an inert organic liquid and in the presence of a catalytic mixture of an alkali metal-aluminum tetraalkyl, the alkyl radicals containing from 1 to 12 carbon atoms, a titanium halide, and a compound of a Group VA element having the formula R₃Z wherein Z is a Group VA element selected from the group consisting of arsenic and antimony and each R is a radical selected from the group consisting of hydrogen and hydrocarbon radicals containing 1 to 12 carbon atoms and selected from the group consisting of alkyl, aryl and aralkyl.

3. In the polymerization of propylene to form solid crystalline polymer, the improvement which comprises effecting the polymerization in liquid dispersion in an organic liquid and in the presence of a catalytic mixture of lithium-aluminum tetraalkyl, the alkyl radicals containing 1 to 12 carbon atoms, titanium tetrachloride, and triphenyl arsine.

4. The method according to claim 3 wherein lithium-aluminum tetraethyl is the tetraalkyl.

5. The method according to claim 3 wherein titanium trichloride is used in place of titanium tetrachloride.

6. In the polymerization of propylene to form solid crystalline polymer, the improvement which comprises effecting the polymerization in liquid dispersion in an organic liquid and in the presence of a catalytic mixture of lithium-aluminum tetraalkyl, the alkyl radicals containing 1 to 12 carbon atoms, titanium tetrachloride, and triphenyl stibine.

7. As a composition of matter, a polymerization catalyst containing an alkali metal-aluminum tetraalkyl, the alkyl radicals containing from 1 to 12 carbon atoms, a halide of a metal selected from the group consisting of titanium, vanadium, zirconium, chromium and molybdenum, the halogen being selected from the group consisting of chlorine, bromine and iodine, and a compound of a Group VA element having the formula R₃Z wherein Z is a Group VA element selected from the group consisting of arsenic and antimony and each R is a radical selected from the group consisting of hydrogen and hydrocarbon radicals containing 1 to 12 carbon atoms and selected from the group consisting of alkyl, aryl and aralkyl.

8. As a composition of matter, a polymerization catalyst containing an alkali metal-aluminum tetraalkyl, the alkyl radicals containing from 1 to 12 carbon atoms, a titanium halide, and a compound of a group VA element having the formula R₃Z wherein Z is a Group VA element selected from the group consisting of arsenic and antimony and each R is a radical selected from the group consisting of hydrogen and hydrocarbon radicals containing 1 to 12 carbon atoms and selected from the group consisting of alkyl, aryl and aralkyl.

9. As a composition of matter, a polymerization catalyst containing lithium-aluminum tetraalkyl, the alkyl radicals containing 1 to 12 carbon atoms, titanium tetrachloride, and triphenyl arsine.

10. As a composition of matter, a polymerization catalyst containing lithium-aluminum tetraalkyl, the alkyl radicals containing 1 to 12 carbon atoms, titanium trichloride, and triphenyl arsine.

11. As a composition of matter, a polymerization catalyst containing lithium-aluminum tetraethyl, titanium tetrachloride, and triphenyl arsine.

12. As a composition of matter, a polymerization catalyst containing lithium-aluminum tetraethyl, titanium trichloride, and triphenyl stibine.

References Cited by the Examiner

UNITED STATES PATENTS

| | | | |
|---|---|---|---|
| 2,862,917 | 12/55 | Anderson et al. | 260—94.9 |
| 2,951,066 | 8/60 | Coover et al. | 260—93.7 |
| 3,072,629 | 1/63 | Coover et al. | 260—93.7 |

JOSEPH L. SCHOFER, *Primary Examiner.*

WILLIAM H. SHORT, *Examiner.*